United States Patent [19]

Umezu et al.

[11] Patent Number: 4,939,910
[45] Date of Patent: Jul. 10, 1990

[54] AIR CONDITIONER

[76] Inventors: Kenji Umezu, 169-126, Kitamatsuno, Fujigawa-cho, Ihara-gun, Shizuoka-ken; Hiroshi Ito, 2348-13, Koizumi, Fujinomiya-shi, Shizuoka-ken; Jitsuo Ikeya, 201-10, Gokanjima, Fuji-shi, Shizuoka-ken, all of Japan

[21] Appl. No.: 355,791

[22] Filed: May 22, 1989

Related U.S. Application Data

[63] Continuation of Ser. No. 114,989, Oct. 30, 1987, abandoned.

[30] Foreign Application Priority Data

Oct. 30, 1986 [JP] Japan ............................... 61-259089
Nov. 27, 1986 [JP] Japan ............................... 61-282922
Feb. 5, 1987 [JP] Japan ............................... 62-23530

[51] Int. Cl.$^5$ .......................... F25B 13/00; F25B 5/00
[52] U.S. Cl. .................................. 62/160; 62/186; 62/198; 62/200; 62/228.4
[58] Field of Search ............... 62/228.1, 228.4, 228.5, 62/159, 160, 199, 200, 198, 324.1, 324.6, 196.2, 208, 209, 203, 186; 236/46 F

[56] References Cited

U.S. PATENT DOCUMENTS

| | | | |
|---|---|---|---|
| 2,245,053 | 6/1941 | Sanders, Jr. ................... | 62/196.2 X |
| 4,173,865 | 11/1979 | Sawyer ......................... | 62/324.6 |
| 4,364,513 | 12/1982 | Tsuzuki et al. ................. | 62/186 X |
| 4,393,662 | 7/1983 | Dirth ............................. | 236/1 B |
| 4,480,443 | 11/1984 | Nishi et al. .................... | 62/243 |

FOREIGN PATENT DOCUMENTS 4829645 8/1971 Japan.
55-8570 1/1980 Japan.
0024745 8/1983 Japan.

Primary Examiner—Harry B. Tanner

[57] ABSTRACT

An air conditioner provided with a heat-pump system refrigerating cycle including a compressor, an outdoor heat exchanger, an expansion valve, an indoor heat exchanger installed within a room, and a radiation type heat exchanger connected in a circuit. An indoor unit includes the indoor heat exchanger, the radiation type heat exchanger displaced in a state exposed to the room and an indoor fan. A selector is provided to select between a warm-air heating during which the indoor fan is turned on and a radiant heating during which the indoor fan is turned off. The capacity of the compressor during the radiant heating mode is adjusted below the capacity during the warm-air heating mode.

44 Claims, 9 Drawing Sheets

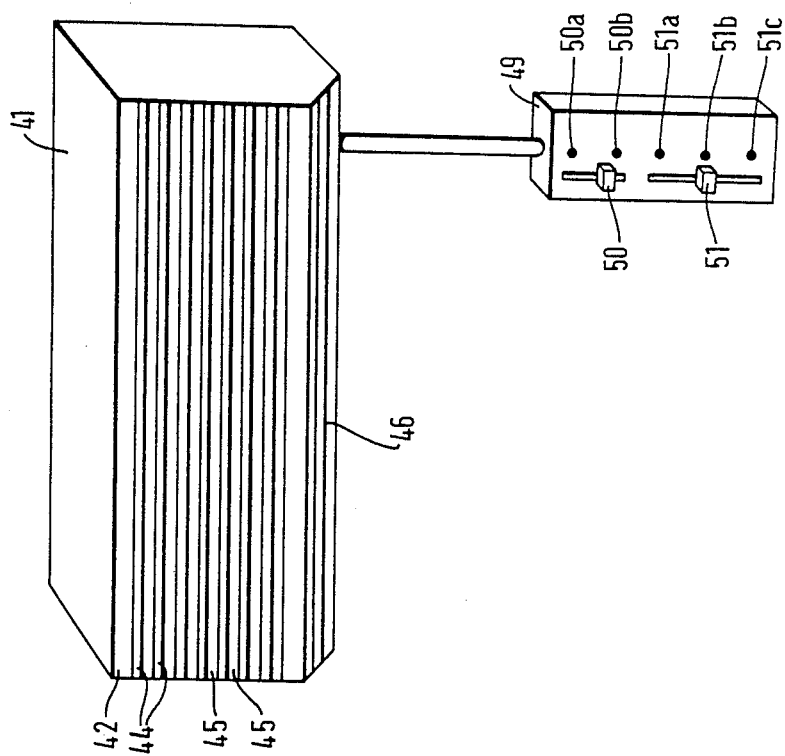
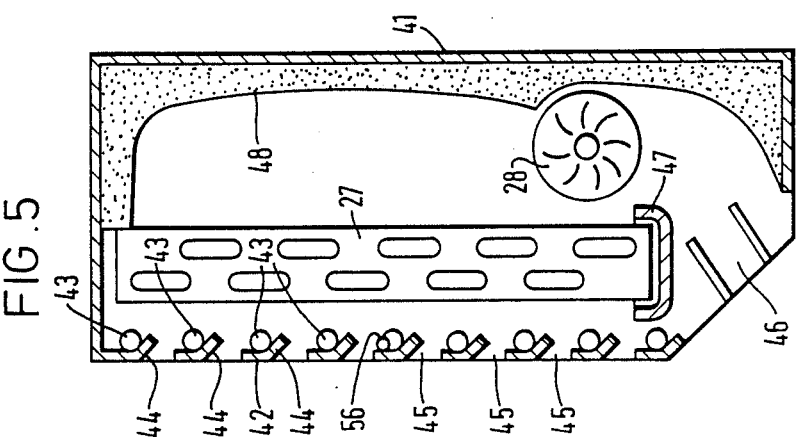

AIR CONDITIONER

This is a continuation of application Ser. No. 07/114,989, filed Oct. 30, 1987, which was abandoned upon the filing hereof.

FIELD OF THE INVENTION

The present invention relates generally to an air conditioner, and more particularly, to a heat-pump type air conditioner which is able to selectively perform a cooling operation or a heating operation for maintaining a desired temperature in a room.

BACKGROUND OF THE INVENTION

Recently, air conditioners provided with a heat-pump type refrigerant circulatory system (referred as refrigeration cycle system hereafter) are rapidly coming into wide-spread use not only for cooling but also heating. Heating with such an air conditioner apparatus has conventionally been convective, in which warm air heated by the air conditioner is exhausted to the room.

Also, stoves such as oil or gas stoves have been used for heating. The stoves operate mainly by radiant heating.

A conventional heat-pump type air conditioner is typically shown in FIG. 1. In FIG. 1, the air conditioner has an outdoor unit 20 and an indoor unit 21. Outdoor unit 20 includes a compressor 22, a four way valve 23, an outdoor heat exchanger 24, an outdoor fan 25 and a pressure reducing device such as an expansion valve 26. Indoor unit 21 includes an indoor heat exchanger 27 and an indoor fan 28.

Compressor 22 is connected to outdoor heat exchanger 24, expansion valve 26 and indoor heat exchanger 27 through four-way valve 23. Four-way valve 23 is provided for controlling the direction of flow of refrigerant so that compressor 22, outdoor heat exchanger 24, expansion valve 26 and indoor heat exchanger 27 constitute a cooling cycle or a heating cycle, as described later. Outdoor fan 25 and indoor fan 28 are mounted adjacent to outdoor heat exchanger 24 and indoor heat exchanger 27, respectively.

In a cooling operation, four-way valve 23 is set to cause flow refrigerant to flow in the direction of solid lines, as shown in the drawing, to form the cooling cycle. The refrigerant discharged from compressor 22 flows circularly through one path of four-way valve 23, outdoor heat exchanger 24, expansion valve 26, indoor heat exchanger 27 and the other path of four-way valve 23 in turn.

Indoor heat exchanger 27, therefore, operates as an evaporator of the refrigerant so that it is cooled. In contrast, outdoor heat exchanger 24 operates as a condenser of the refrigerant so that it is heated. As a result, heat in the room is absorbed by the refrigerant in indoor heat exchanger 27 and then transmitted to outdoor heat exchanger 24. Heat of the refrigerant is then transferred to the outdoor air through OutdoOr heat exchanger 24. The air conditioner thus cools objects or persons through a convection of the cooled air.

In a heating operation, four-way valve 23 is set to cause the refrigerant to flow in the direction of broken lines, as shown in the drawing, to form a heating cycle. The refrigerant discharged from compressor 22 flows circularly through one path of four-way valve 23, indoor heat exchanger 24, expansion valve 26, outdoor heat exchanger 27 and the other path of four-way valve 23 in turn.

Indoor heat exchanger 27, therefore, operates as a condenser of the refrigerant so that it is heated or warmed. In contrast, outdoor heat exchanger 24 operates as an evaporator of the refrigerant so that it is cooled. As a result, heat from outside is absorbed by the refrigerant in outdoor heat exchanger 24 and then transmitted to indoor heat exchanger 27. Heat of the refrigerant is then transfered to air inside the room through indoor heat exchanger 27. The air conditioner thus heats. Objects or persons indoors through the convection of warm air.

The air conditioner, i.e., the convective heating by the air conditioner, is superior for warming the whole room. However, convective heating has a disadvantage of creating drafts. Further the convective heating has another disadvantage in that persons feel a rather cool heating in comparison to radiant heating by stoves and the like because the output air is sometimes lower than skin temperature. Convective heating is also inferior to radiant heating when rapid heating is desired.

Accordingly, there has been developed a heat-pump type air conditioner which is provided with not only an indoor heat exchanger for warming air but also g heat radiation panel such as disclosed in Japanese Patent Disclosure No. P55-8570. Indoor heat exchanger is mounted in indoor unit, and heat radiation panel is mounted in front of indoor unit. Heat radiation panel has refrigerant pipes installed on its rear surface.

Heat radiation panel radiates heat due to the high temperature of refrigerant flowing in the pipes. As a result, persons facing heat radiation panel can enjoy a remarkable heating.

Convective heating and radiant heating, however, have not been properly used in the conventional air conditioners. That is, radiant heating always occurs simultaneously with convective heating. Therefore, convective heating and radiant heating could not exhibit sufficiently their features for offering comfortable heating. Also, the compressor in the conventional air conditioner always operates at the same capacity, wasting energy.

This invention is made in view of the above-mentioned circumstances for offering comfortable heatings by performing properly convective heating and radiant heating in an energy-efficient manner.

SUMMARY OF THE INVENTION

It is an object of the present invention to provide an air conditioner which is able of offering a comfortable heating.

It is another object of the present invention to provide an air conditioner which performs properly convective heating and radiant heating.

In order to achieve the above object, an air conditioner according to one aspect of the present invention includes a heat-pump system refrigerating cycle including a compressor, an outdoor heat exchanger, an expansion valve, an indoor heat exchanger installed within a room, and a radiation type heat exchanger connected in a circuit. An indoor unit includes the indoor heat exchanger, the radiation type heat exchanger displaced in a state exposed to the room and an indoor fan. A selector is provided to select between a warm-air heating during which the indoor fan is turned on and a radiant heating during which the indoor fan is turned off. The capacity of the compressor during the radiant heating mode is adjusted below the capacity during the warm-air heating mode.

BRIEF DESCRIPTION OF THE DRAWINGS

Additional objects and advantages of the present invention will be apparent to persons skilled in the art from a study of the following description and the accompanying drawings, which are hereby incorporated in and constitute a part of this specification, wherein:

FIG. 5 is a side sectional view showing an indoor unit preferrable for the embodiment of FIG. 2;

FIG. 6 is a perspective view showing an example of the indoor unit of FIG. 5;

DESCRIPTION OF THE PREFERRED EMBODIMENTS

Figure 1:
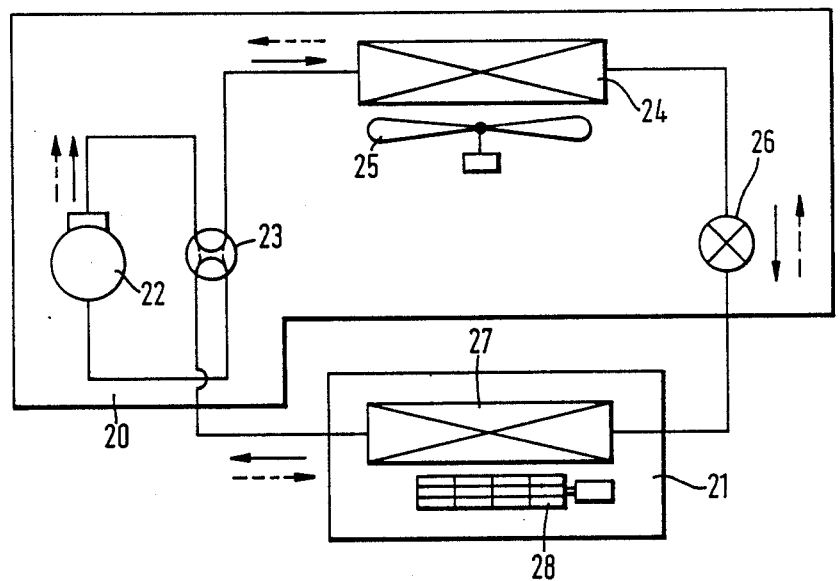
FIG. 1 is a circuit diagram of a conventional air conditioner.

The present invention will be described in detail with reference to FIGS. 2 through 15. Throughout the drawings, reference numerals or letters used in FIG. 1 (Prior Art) will be used to designate like or equivalent elements for simplicity of explanation.

Figure 2:
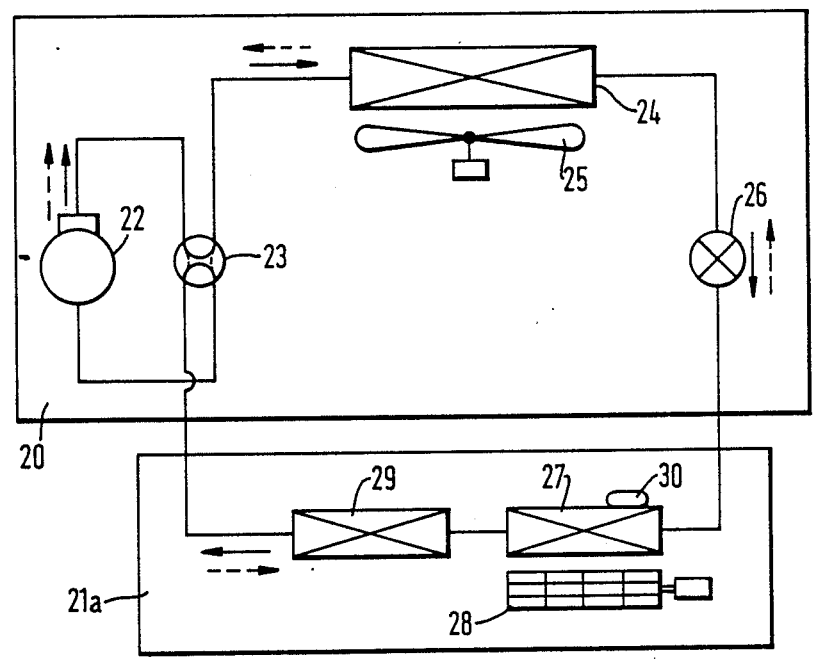
FIG. 2 is a circuit diagram of an air conditioner according to an embodiment of the present invention.
Figure 7:
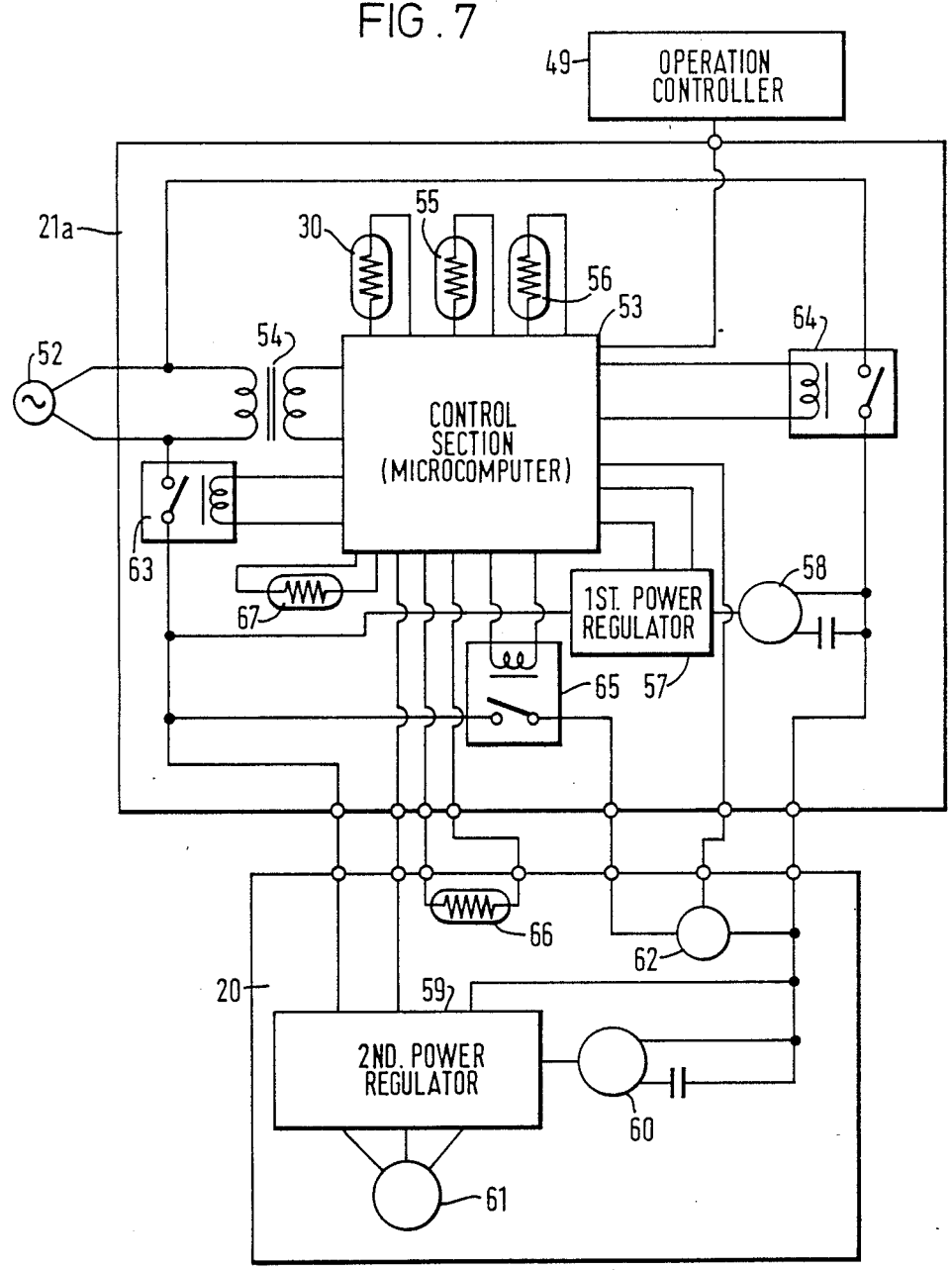
FIG. 7 is a circuit diagram showing a controller for controlling the air conditioner of FIG. 2.

Referring now to FIGS. 2 to 11, an embodiment of the air conditioner according to the present invention will be described in detail. In FIG. 2, parts which are not relevant to the control of the apparatus are omitted from the illustration, but the control parts are shown in FIG. 7 and will be described in detail later.

In FIG. 2, the first embodiment of the air conditioner has an outdoor unit 20 and an indoor unit 21a. Outdoor unit 20 is equivalent to that of the conventional air conditioner, as shown in FIG. 1. Therefore, a detail description of outdoor unit 20 will be omitted here.

Indoor unit 21a is different from indoor unit 21 of the conventional air conditioner, as shown in FIG. 1, in that indoor unit 21a further includes a radiant heat exchanger 29 and a temperature sensor 30. Radiant heat exchanger 29 is connected in series with indoor heat exchanger 27. Temperature sensor 30 is mounted on a prescribed portion in indoor unit 21, e.g., on indoor heat exchanger 27. Temperature sensor 30 is mounted on a prescribed portion of compressor 22.

In a cooling operation, four-way valve 23 is set to direct refrigerant in the direction of solid lines, as shown in the drawing, to form the cooling cycle. Refrigerant discharged from compressor 22 flows circularly through one path of four-way valve 23, outdoor heat exchanger 24, expansion valve 26, indoor heat exchanger 27, radiant heat exchanger 29 and the other path of four-way valve 23 in turn.

Indoor heat exchanger 27, therefore, operates as an evaporator of refrigerant so that it is cooled. In contrast, outdoor heat exchanger 24 operates as a condenser of refrigerant so that it is heated. As a result, indoor heat is absorbed by refrigerant in indoor heat exchanger 27 and then transmitted to outdoor heat exchanger 24. The heat of refrigerant is then transferred to outdoor air through outdoor heat exchanger 24. The air conditioner thus cools objects or persons through a convection of the cooled air.

In a heating operation, four-way valve 23 is set to direct refrigerant in the direction of broken lines, as shown in the drawing, to form a heating cycle. Refrigerant outputted from compressor 22 flows circularly through one path of four-way valve 23, radiant heat exchanger 29, indoor exchanger 24 and the other path of four-way valve 23 in turn.

Indoor heat exchanger 27, therefore, operates as a condenser of refrigerant so that it is heated or warmed. In contrast, outdoor heat exchanger 24 operates as an evaporator of refrigerant so that it is cooled. As a result, heat of outdoor air is absorbed by refrigerant in outdoor heat exchanger 24 and then transmitted to indoor heat exchanger 27. Heat of refrigerant is then transferred indoors through indoor heat exchanger 27. The air conditioner thus performs convective heating operation for warming the room through the convection of the warm-air.

Figure 3:
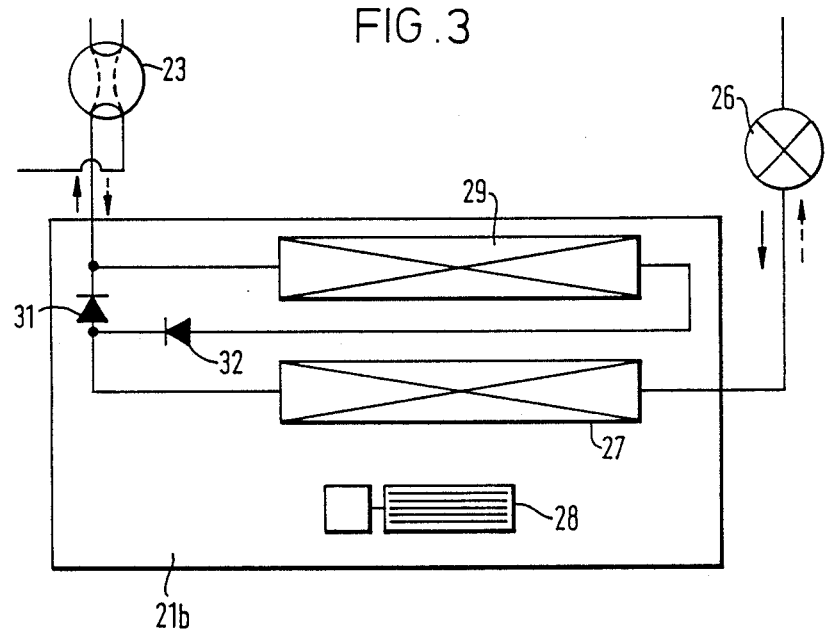
FIG. 3 is a circuit diagram showing a modification of indoor unit of FIG. 2.

FIG. 3 shows a modified indoor unit 21b. In FIG. 3, indoor heat exchanger 27 is coupled to four-way valve 23 through a first check valve 31 which allows refrigerant to flow only in the direction from indoor heat exchanger 27 to four-way valve 23. Radiant heat exchanger 29 is coupled in parallel to first check valve 31 through a second check valve 32 which allows refrigerant to flow only in the direction from four-way valve 23 to indoor heat exchanger 27.

Therefore, second check valve 32 prevents refrigerant to flow through radiant heat exchanger 29 in the cooling operation. And first and second check valves 31 and 32 allow refrigerant to flow through radiant heat exchanger 29 during heating. In other words, radiant heat exchanger 29 is activated only during heating. The remainder of the apparatus of this embodiment is the same as in the embodiment of FIG. 2.

Figure 4:
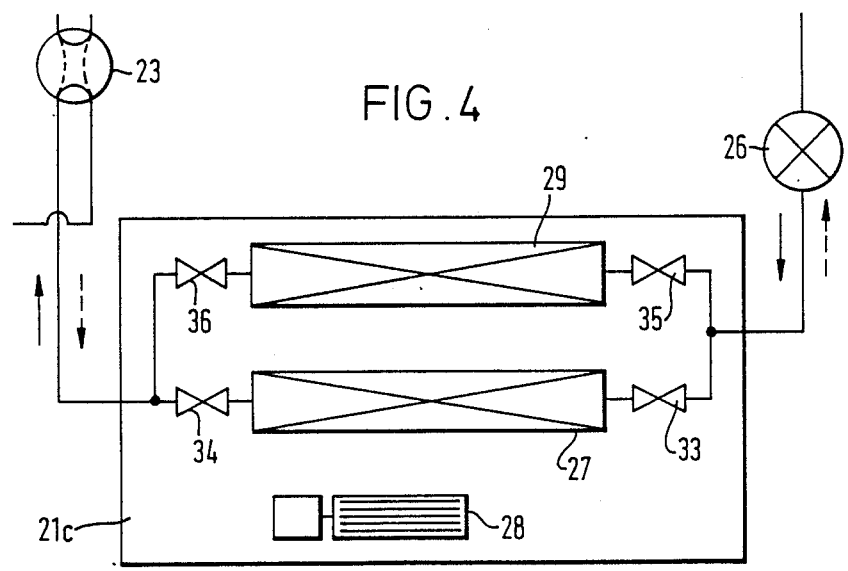
FIG. 4 is a circuit diagram showing another modification of the indoor unit of FIG. 2.

FIG. 4 shows another modified indoor unit 21c. In FIG. 4, indoor heat exchanger 27 and radiant heat exchanger 29 are coupled in parallel with each other. In this modification, control valves 33 to 36 are provided for inlets and outlets of indoor heat exchanger 27 and radiant heat exchanger 29, respectively. Control valves 33 to 36 control flow of refrigerant in indoor unit 21c in response to the operation mode. Control valves 33 to 36, however, can be omitted. The remainder of the apparatus of this is the same as in the embodiment of FIG. 2. During cooling valves 35 and 36 can be closed. During heating valves 33 and 34 can be closed if only radiant heating is desired, although valves 33 and 34 need not be closed.

A practical structure of indoor units 21a to 21c will be described below in reference to FIGS. 5 and 6. FIG. 5 shows a sectional view of a wall-mount type indoor unit. Wall mount type indoor units are set on room walls in relatively high positions near the ceiling. FIG. 6 shows a perspective view of the indoor unit.

The indoor unit includes indoor heat exchanger 27 and indoor fan 28 in a housing 41. Radiant heat exchanger 29 is comprised of a heat radiation panel 42 and a plurality of pipes 43. Heat radiation panel 42 is made of metal and further constitutes a front panel of housing 41. The pipes 43 are fixed to the inner surface of heat radiation panel 42. Portions of heat radiation panel 42 are bent inwards, as shown in FIG. 5, to create a plurality of longitudinal fins 44 and slits 45. Pipes 43 are each fixed to the bent portions, e.g., fins 44 of heat radiation panel 42 and coupled in series with each other. One of pipes 43 is provided with a temperature sensor 56 for detecting the temperature at radiant heat exchanger 29.

Housing 41 has an outlet 46 in a bottom corner between heat radiation panel 42 and the bottom of housing 41. Indoor heat exchanger 27 is mounted in parallel with heat radiation panel 42. A drain through 47 is provided at the bottom of indoor heat exchanger 27. A thermal insulator 48 is provided in housing 41 for covering prescribed portions, e.g., rear, top, bottom and sides of housing 41.

Indoor fan 28 is provided in housing 41 to induce air into housing 41 through slits 45 and exhaust air through outlet 46. As a result, cool or warm air circulates indoors through the indoor unit.

The indoor unit has an operation controller 49 of a remote control type separate from housing 41, as shown in FIG. 6. Operation controller 49 is provided with a cooling/heating change-over switch 50 and a heating mode change-over switch 51.

Cooling/heating change-over switch 50 has two positions. A "COOLING" mode position 50a implements the cooling operation and a "HEATING" mode position 50b implements heating operation. Heating mode change over switch 51 has three mode positions. A "FAN/PANEL" mode position 51a implements both convective heating and radiant heating. An "AUTO" (abbreviation of "AUTOMATIC") mode position 51b implements an automatic change between convective heating and radiant heating. A "PANEL" mode position 51c implements radiant heating only. Further, operation controller 49 is provided with a power switch and a temperature setting knob (both being not shown).

Referring now to FIG. 7, a control circuit for controlling the air conditioner of FIG. 2 will be described. In FIG. 7, numeral 52 denotes a commercial AC power source. A control section comprised of a microcomputer 53 is connected to power source 52 through a transformer 54. Microcomputer 53 performs an overall control of the air conditioner together with other related circuits, as described below.

Microcomputer 53 is provided with a plurality of temperature sensors, e.g., a room temperature sensor 55, indoor heat exchanger temperature sensor 30, panel temperature sensor 56, a compressor output temperature sensor 67, a first power regulator 57 for an indoor fan motor 58 and a second power regulator 59 for both an outdoor fan motor 60 and a compressor motor 61, a four-way valve driver 62, relays 63, 64 and 65, and an outdoor temperature sensor 66.

Indoor fan motor 58 is connected to power source 52 through relays 63, 64 and first power regulator 57. First power regulator 57 regulates a power to be supplied to indoor fan motor 58 under the control of microcomputer 53. Outdoor fan motor 60 is connected to power source 52 through relays 63, 64 and second power regulator 59. Second power regulator 59 regulates a power to be supplied to outdoor fan motor 60 under the control of microcomputer 53. Four-way valve driver 62 is connected to power source 52 through relays 63, 64 and 65.

Compressor 22 is of a variable capacity type. Second power regulator 59 includes a circuit (not shown) for controlling compressor 22 through compressor motor 61, e.g., an inverter circuit for regulating power to be supplied to compressor motor 61. The inverter circuit converts the uniphase AC power supplied from power source 52 to a three-phase AC power with a frequency and a voltage conforming to the command of microcomputer 53.

Figure 8:
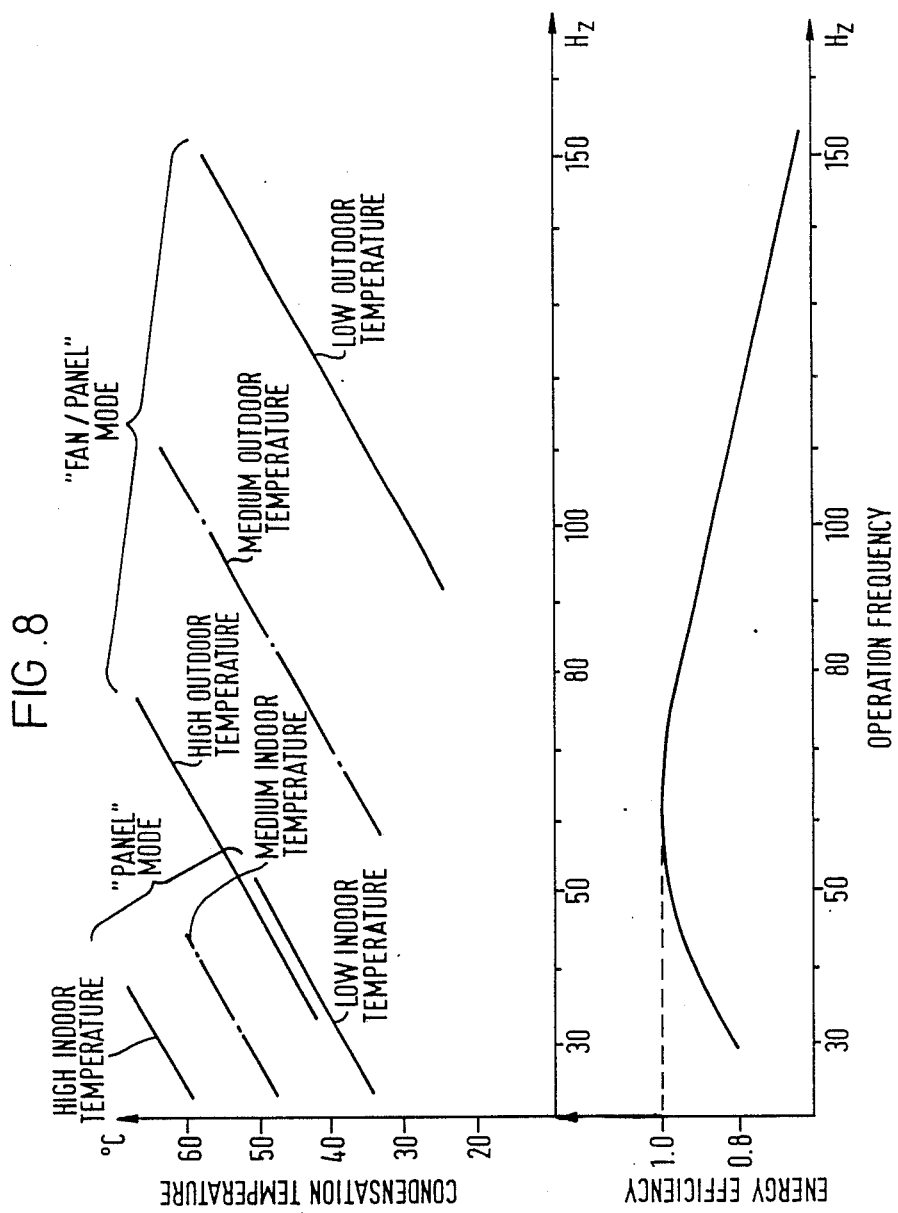
FIG. 8 is a graph showing operations of the compressor of FIG. 2.

Referring now to FIGS. 7 and 8, the operation of the embodiment of FIG. 2, in particular, the heating operation will be described.

The heating operation is set by heating/cooling changeover switch 50 of operation controller 49 (see FIG. 7). The "FAN/PANEL" mode is set by heating mode selector switch 51. In the "FAN/PANEL" mode, the air conditioner is controlled to carry out simultaneously both convective heating and radiant heating. Further, a desired room temperature is set by the temperature setting knob (not shown). Then relays 63, 64 and 65 are all excited so that first power regulator 57, second power regulator 59 and four-way valve driver 62 are activated.

First power regulator 57 and second power regulator 59 drive indoor fan 25, outdoor fan 28 and compressor 22. Further, four-way valve driver 62 drives four-way valve 23 so that refrigerant flows in the direction of the broken lines. As a result, a heating cycle of the "FAN/PANEL" mode is established.

In heating cycle, indoor heat exchanger 27 and radiant heat exchanger 29 operate as condensers of refrigerant. Indoor fan 28 rotates so that the air in the room is induced into the indoor unit through slits 45 of heat radiation panel 42. The induced air passes through indoor heat exchanger 27 and is then exhausted from outlet 46. The air is heated mainly from indoor heat exchanger 27 so that the air becomes warm. Thus, indoor heat exchanger 27 contributes to convective heating.

Heat radiation panel 42 is heated by pipes 43. The heat is then radiated from heat radiation panel 42. Thus, radiant heat exchanger 29 contributes to radiant heating.

In samples of the air conditioner designed by the inventor, heating ability of indoor heat exchanger 27 is set to the order of about 3,000 to 4,500 kcal/h, while heating ability of radiant heat exchanger 29 is set to the order of about 500 to 1,200 kcal/h.

In the "FAN/PANEL" mode, the air inside the room is warmed by convective heating. Also persons present in front of radiant heat exchanger 29 can enjoy strong radiant heating. Therefor, they can be quickly warmed, in the same manner in using other radiant heaters such as oil stoves. Radiant heating is particularly effective when cold is severe, such as a winter morning and/or evening.

When both convective heating and radiant heating are being performed, microcomputer 53 monitors the temperature detected by room temperature sensor 55. Microcomputer 53 controls the frequency (referred as operating frequency hereafter) of the three-phase AC power supplied from the inverter circuit in second power regulator 59 to compressor motor 61 according to the difference between the detected temperature and the set temperature.

As a result, the capacity of compressor 22, i.e., the pressure of refrigerant outputted from compressor 22 is properly adjusted. In this case, the operating frequency varies among 30 Hz to 150 Hz in proportion to the difference between the detected temperature and the set temperature. When the difference between the detected temperature and the set temperature is larger than a prescribed value, the control for the inverter circuit is carried out so that the operating frequency increases.

When the difference between the detected temperature and the set temperature is smaller than the prescribed value, the control for the inverter circuit is carried out so that the operating frequency decreases. As a result, the temperature (referred as condensation temperature hereafter) of refrigerant discharged from compressor 22 varies. The condensation temperature is in proportion to the pressure of refrigerant discharged from compressor 22.

The condensation temperature of refrigerant varies in accordance with the operation frequency, as shown in FIG. 8. Indoor heat exchanger temperature sensor 30 detects the condensation temperature of refrigerant. Microcomputer 53 carries out a fine adjustment of the operation frequency so that the condensation temperature is held in the range of 40° C. to 60° C., as shown in FIG. 8.

As a result, compressor 22 is prevented from failures caused by an excessive high temperature of refrigerant. Also, persons present inside the room feel a sufficient amount of heating. Moreover, indoor fan 28 is provided for varying its rotation speed among a minimum speed F1 to a maximum speed F8, as described later. Indoor heat exchanger temperature sensor 30 can be used for an automatic control of the rotation speed of indoor fan motor 58 so that indoor fan 28 rotates slowly when the temperature detected by indoor heat exchanger temperature sensor 30 is low while indoor fan 28 rotates fast when the detected temperature of indoor heat exchanger temperature sensor 30 is high.

The "PANEL" mode is set by heating mode selector switch 51. In the "PANEL" mode, the air conditioner is controlled to perform radiant heating only. Further, a desired room temperature is set by the temperature setting knob (not shown). Set temperature shown). Set temperature Ts of the refrigerant corresponds to the desired room temperature. Then relays 63, 64 and 65 are all excited so that second power regulator 59 and four-way valve driver 62 are activated. However, first power regulator 57 is left deactivated.

Second power regulator 59 drives outdoor fan 28 and compressor 22. Further, four-way valve driver 62 drives four-way valve 23 so that refrigerant flows in the direction of the broken lines. As a result, heating cycle of the "PANEL" mode is established.

In this heating cycle, radiant heat exchanger 29 and also, depending on the embodiment, indoor heat exchanger 27, operate as condensers of refrigerant. However, indoor fan 28 does not rotate so that indoor heat exchanger 27 almost stops its heating operation.

Heat radiation panel 42 takes heat from pipes 44. The heat is then radiated from heat radiation panel 42. Thus, the indoor unit of the air conditioner carries out radiant heating only.

In the samples of the air conditioner designed by the inventor, the heating ability of radiant heat exchanger 29 is relatively low in comparison to indoor heat exchanger 27 in the "FAN" mode operation. Therefore, the operation frequency applied to compressor motor 61 is decreased to the range of about 30 Hz to 40 Hz so that the capacity of compressor 22 is lowered. Thus, the air conditioner does not waste power.

Control section 53 monitors panel temperature sensor 56 and controls the operation frequency so that the temperature of refrigerant in radiant heat exchanger 29 becomes constant at the set temperature in the range of about 40° C. to 60° C. When the temperature of refrigerant exceeds the set temperature, control section 53 stops the power supply to compressor motor 61 so that compressor 22 is protected from failures. Thus, compressor 22 of the air conditioner is intermittently operated to keep the temperature of refrigerant at the set temperature.

It is desirable that the temperature of radiant heat exchanger 29 quickly reaches the set temperature at the beginning of heating operation. For this purpose, microcomputer 53 controls second power regulator 59 so that a prescribed operation frequency higher than the frequency in the regular operation state is supplied to compressor motor 61 until the temperature of radiant heat exchanger 29 reaches the set temperature.

For example, when the set temperature is 60° C., the higher operation frequency is supplied to compressor motor 61 until the temperature detected by panel temperature sensor 56, i.e., the temperature of radiant heat exchanger 29 reaches 50° C. near the set temperature of 60° C. However, an excessively higher operation frequency should be avoided because it results in a reduction of efficiency of compressor 22. Therefore, the higher operation frequency is selected from a value in the range of about 60 Hz to 80 Hz.

Radiant heating with radiant heat exchanger 29 allows persons facing heat radiation panel 42 to feel warm quickly. The radiant heating is further effective because it does not create drafts or ventilation noise. Therefore, radiant heating is suitable, e.g., for heating during sleeping, working or studying. Further, radiant heating is very economical because the decrease in the operation frequency of compressor motor 61 consumes power.

The "AUTO" mode is set by heating mode selector switch 51. In the "AUTO" mode, the air conditioner is automatically controlled to perform either of the operations of the "FAN/PANEL" mode or the "PANEL" mode by microcomputer 53. For example, microcomputer 53 controls the selective operations of the "FAN/PANEL" mode and the "PANEL" mode in accordance with a timer. Or, microcomputer 53 commands the "FAN/PANEL" mode until a room air temperature reaches a prescribed set temperature and then commands the "PANEL" mode according to the difference of the temperature detected by indoor temperature sensor 55 and the set temperature.

Figure 9:
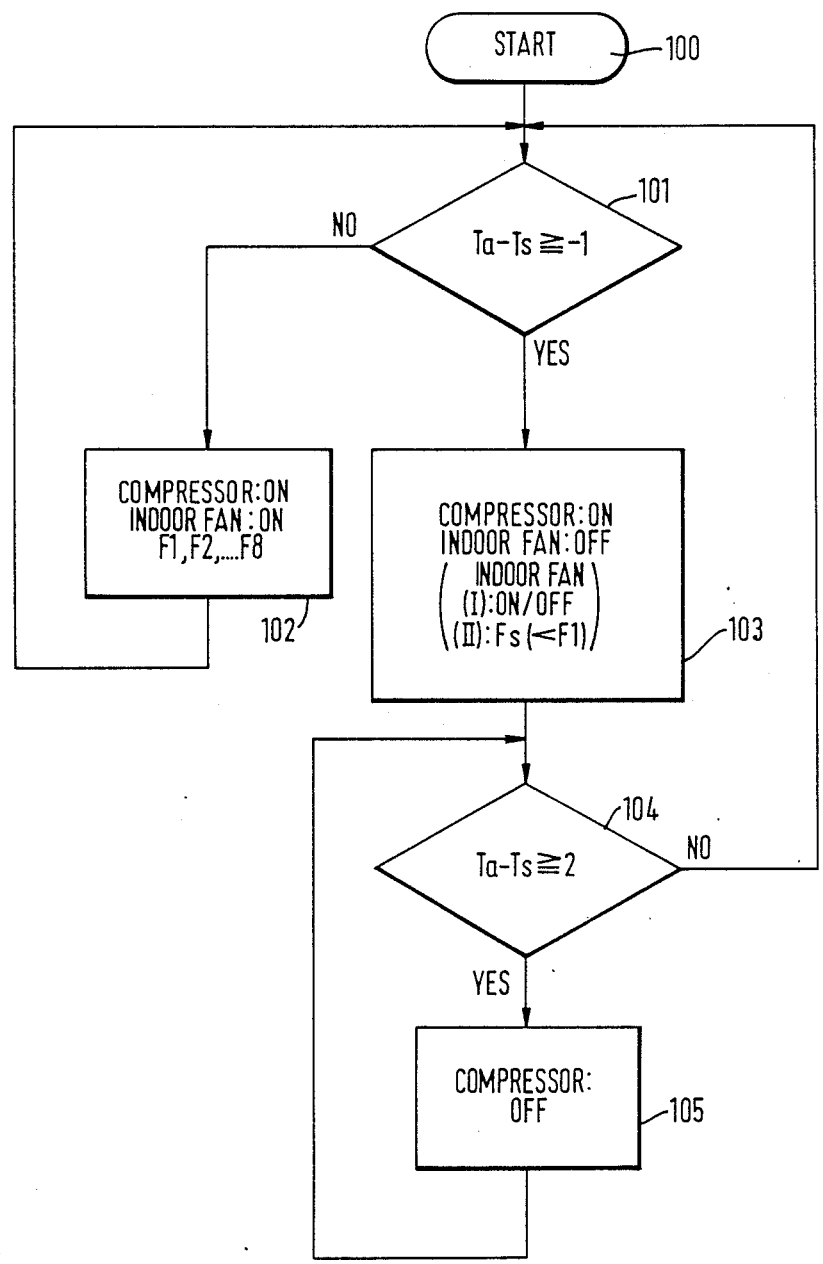
FIG. 9 is a flow chart indicating one aspect of the control for the heating operation of the air conditioner of FIG. 2.

FIG. 9 shows a flow chart indicating one aspect of the control for the heating operation of the air conditioner in the "AUTO" mode. It can be seen that the control is obtained by logic flow through a series of logic steps carried out by microcomputer 53 (see FIG. 7).

After starting at step 100, microcomputer 53, at step 101, reads a room temperature Ta sensed by room temperature sensor 55. It then carries out a judgement for whether [Ta−Ts≧−1] is YES or NO, where Ts is a set temperature. This equation indicates that the ambient temperature in the room is no less than 1° C. lower than the set temperature Ts. The temperature difference can be suitably replaced by other values.

When the result of the judgement is NO, processing advances to a step 102. At step 102 compressor motor 61 and indoor fan motor 58 are activated so that compressor 22 and indoor fan 28 operate. The rotation speed of indoor fan 28 is varied, e.g., among eight speeds of F1, F2, . . . F8 in response to the difference between the room temperature Ta and the set temperature Ts. Thereafter the judgement of step 101 is again carried out.

When the result of the judgement at step 101 is YES, the processing advances to a step 103. At step 103 compressor 22 operates but indoor fan 28 stops. Alternatively indoor fan 28 can be controlled to reduce its ventilation ability instead of stopping. The reduction of the ventilation ability of indoor fan 28 can be selected from (I) intermittent ON or OFF operation, and (II) operation at a rotation speed Fs which is lower than the lowest speed F1 in step 102.

At step 104, microcomputer 53 again reads the room temperature Ta and carries out another judgement for whether [Ta−Ts≧2] is YES or NO. The above equation determines whether the room temperature Ta exceeds the set temperature Ts by 2° C. or more. The temperature difference can also be suitably replaced by other values.

When the result of the judgement at step 104 is NO, the processing returns to step 101. So that, step 102 or step 103 is carried out.

When the result of the judgement at step 104 is YES, the processing advances to a step 105. At step 105, compressor motor 61 and indoor fan motor 58 are deactivated so that compressor 22 and indoor fan 28 stop.

After step 105, the processing returns to step 104. Therefore, microcomputor 53 again reads the room temperature Ta carries out the judgement of step 105.

Figure 10:
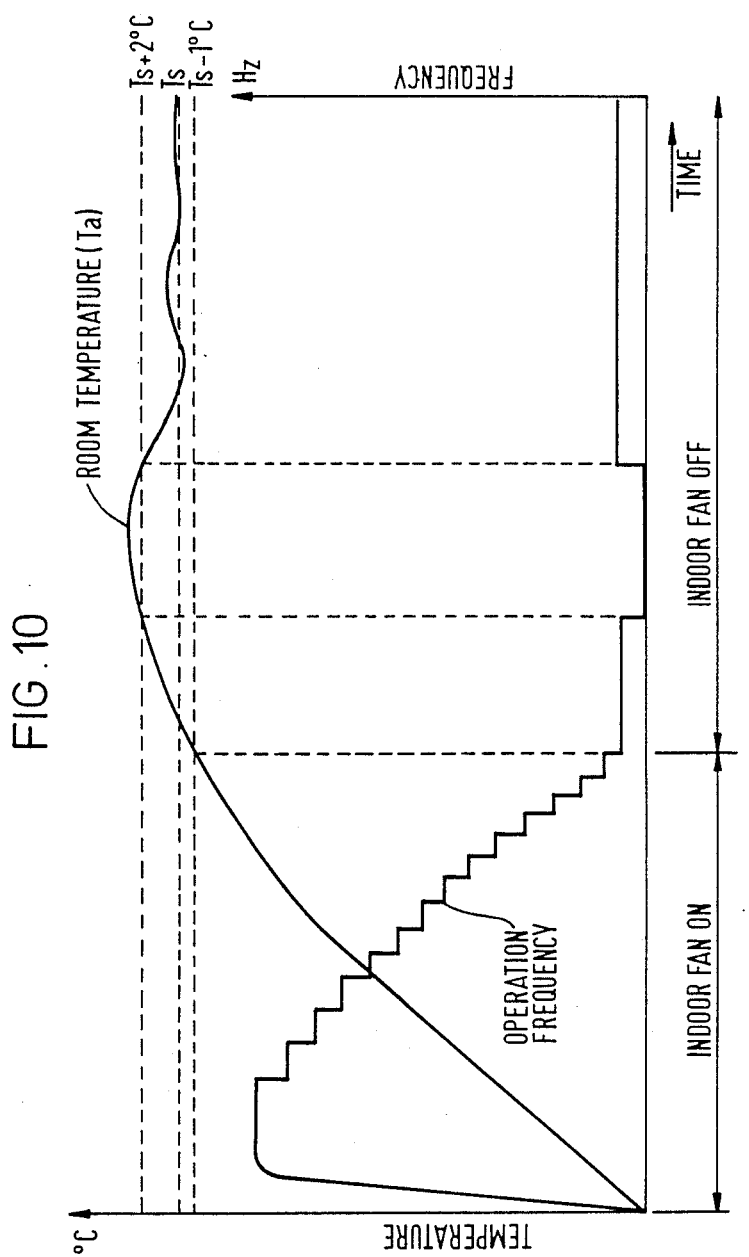
FIG. 10 is a graph showing the operation of the air conditioner of FIG. 2.

Referring now to FIG. 10, the control of compressor 22 in heating operation will be described, in relation to the change of the room temperature Ta. FIG. 10 shows the graphs indicating the changes of the operating frequency of compressor motor 61 and the room temperature Ta.

At the beginning of heating operation (step 101), compressor motor 61 is supplied with the highest operating frequency so that compressor 22 operates at its maximum ability. As a result, the room temperature Ta is warmed quickly. In this operation, indoor fan 28 operates at its maximum rotation speed F8 (step 103).

When the room temperature Ta comes close to the set temperature Ts, the operating frequency is gradually decreased so that the capacity of compressor 22 is reduced. The rotation speed of indoor fan 28 is also reduced (step 103). When the room temperature Ta has reached a prescribed temperature below the set temperature Ts by 1° C. or less, compressor motor 61 operates at the lowest operating frequency but indoor fan motor 58 stops (step 104). Thereafter, radiant heat exchanger 29 provides radiant heat. During radiant heating, the room temperature Ta is maintained in the range between 1° C. lower than the set temperature Ts and 2° C. higher than the set temperature Ts.

Figure 11:
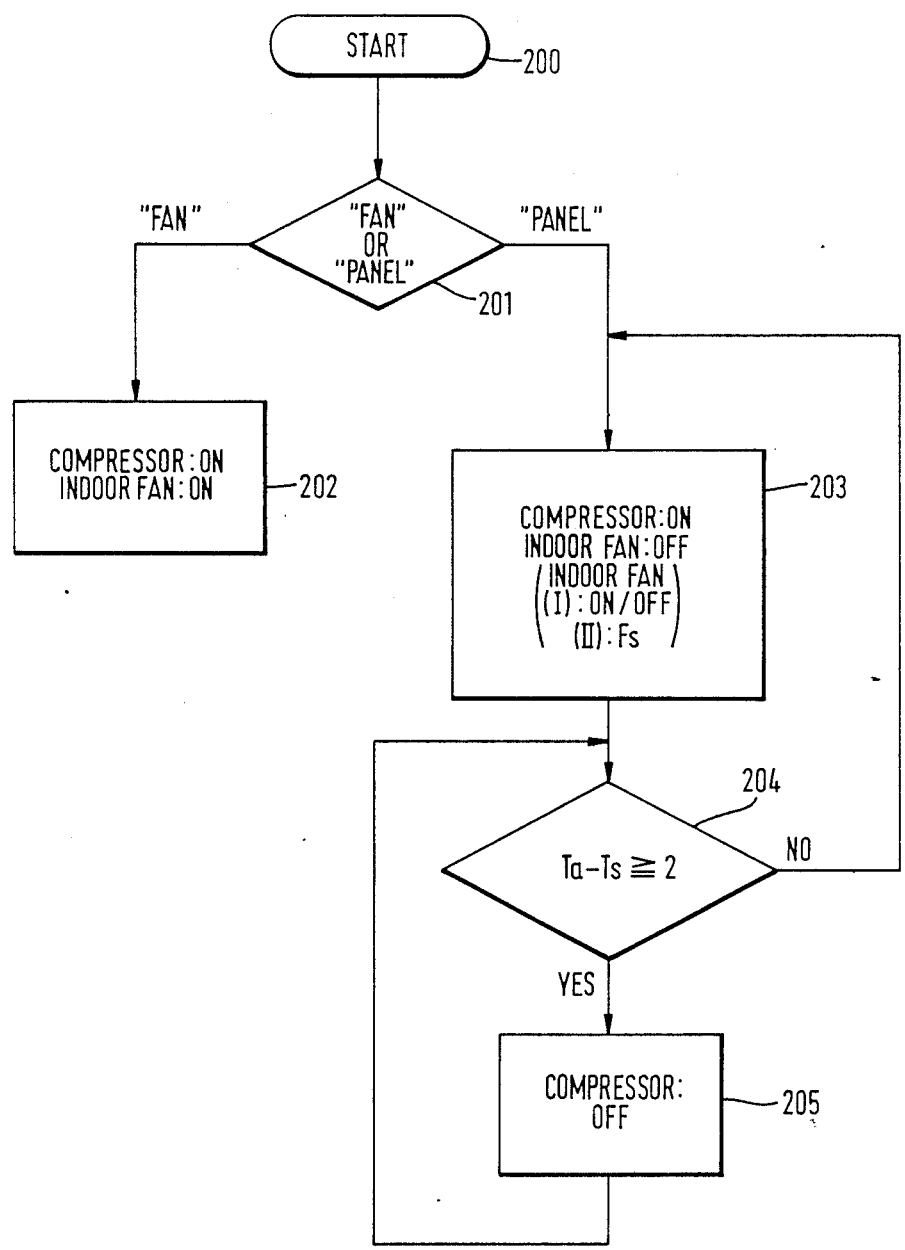
FIG. 11 is a flow chart indicating another aspect of the control for the heating operation of the air conditioner of FIG. 2.

FIG. 11 shows a flow chart indicating another aspect of heating control. This aspect of control occurs when heating mode change-over switch 51 is in either "FAN/PANEL" mode position 51a or "PANEL" mode position 51c. It can also be seen that a part of the control is obtained by logic flow through a series of logic steps carried out by microcomputer 53 (see FIG. 7).

After starting at step 200 by setting cooling/heating change-over switch 50 to heating (see FIG. 6), heating mode change-over switch 51, at step 201, is operated. When the "FAN/PANEL" mode position 51a is selected, processing advances to a step 202. At step 202 compressor motor 61 and indoor fan motor 58 are activated so that compressor 22 and indoor fan 28 operate. As a result, the air conditioner carries out conventional convective heating with indoor heat exchanger 27. The rotation of indoor fan 28 is varied, e.g., among three speeds in response to the difference between the room temperature Ta and the set temperature Ts. In the arrangement of the indoor unit illustrated in FIG. 4, only convective heating may be carried out in this mode. In the arrangemnet of the indoor unt illustrated in FIGS. 2 or 3, both convective heating and radiant heating would be carried out in this mode.

When the "PANEL" mode position is selected, the processing advances to a step 203. At step 203 compressor motor 61 is activated but indoor fan motor 58 is deactivated so that compressor 22 operates but indoor fan 28 stops. As a result, the air conditioner carries out radiant heating with radiant heat exchanger 29.

Alternatively, at step 203 indoor fan 28 can be controlled to reduce its capacity instead of stopping. The reduction of the capacity of indoor fan 28 can be selected from (I) intermittent ON or OFF operation, and (II) operation at a rotation speed Fs very much lower than the lowest rotation speed at step 202.

At step 204, microcomputer 53 reads the room temperature Ta and carries out a judgement for whether [Ta−Ts≧2] is YES or NO. The above equation determines whether the room temperature Ta exceeds the set temperature Ts by 2° C. or more. The temperature difference can be suitably replaced by other values.

When the result of the judgement at step 204 is NO, the processing returns to step 203. So that, step 203 is again carried out.

When the result of the judgement at step 204 is YES, the processing advances to a step 205. At step 205, compressor motor 61 and indoor fan motor 58 are deactivated so that compressor 22 and indoor fan 28 stop.

After step 205, the processing returns to step 204. Therefore, microcomputer 53 again reads the room temperature Ta and carries out the judgement of step 204.

In the above embodiment, the indoor unit is a wall-mount type. However, the present invention can be applied to a floor-mount type indoor unit, as described below. Floor-mount type indoor units are set on room floors near a room corner.

Referring now to FIGS. 12 to 15, the embodiment applied to a floor-mount type indoor unit 21d will be described. In FIGS. 12 to 15, indoor unit 21d includes indoor heat exchanger 27 and indoor fan 28 in a housing 41. Radiant heat exchanger 29 is comprised of a heat radiation panel 42 and a plurality of pipes 43. Heat radiation panel 42 is made of metal and further constitutes a front panel of housing 41. Pipes 43 are each fixed to the rear surface of heat radiation panel 42 and connected in series with each other.

Figure 13:
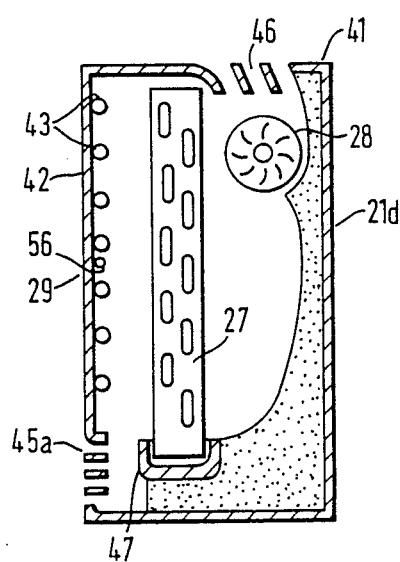
FIG. 13 is a side sectional view of the indoor unit of FIG. 12.
Figure 14:
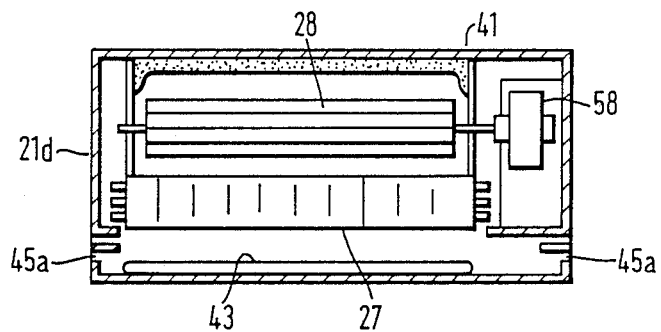
FIG. 14 is a top sectional view of the indoor unit of FIG. 12.
Figure 15:
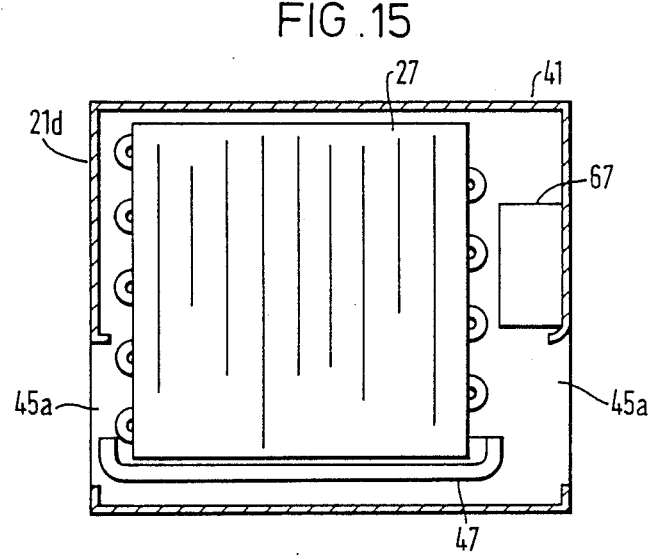
FIG. 15 is a front sectional view of the indoor unit of FIG. 12.

Housing 41 has a plurality of inlets 45a and an outlet 46, as shown in FIG. 13. Inlets 45a are formed at the bottom of heat radiation panel 42 and sides of housing 41. Outlet 46 is formed at the top of housing 41. Indoor heat exchanger 27 is mounted in parallel with heat radiation panel 42. A panel temperature sensor 56 is fixed to the rear surface of heat radiation panel 42. A drain trough 47 is mounted on bottom of indoor heat exchanger 27. A thermal insulator 48 is provided in housing 41 for covering prescribed portions, e.g., rear, bottom and sides of housing 41. An electric circuit box 67 is mounted inside housing 41 adjacent to indoor heat exchanger 27, as shown in FIG. 15.

Indoor fan 28 is provided in housing 41 to induce air into housing 41 through inlets 45a and exhaust air through outlet 46.

Figure 12:
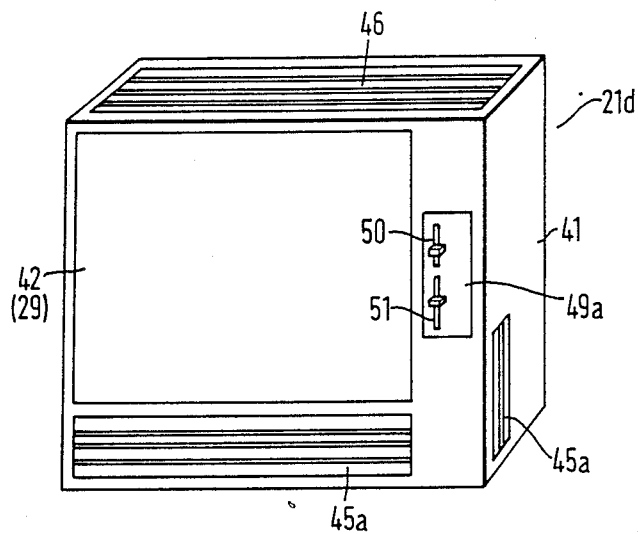
FIG. 12 is a perspective view showing another preferrable example of the indoor unit of FIG. 2.

Indoor unit 21d has an operation controller 49a near right side of heat radiation panel 42, as shown in FIG. 12. Operation controller 49a is provided with a cooling-/heating change-over switch 50 and a heating mode change-over switch 51. Cooling/heating change-over switch 50 and heating mode change-over switch 51 are the same as in the first embodiment of FIG. 6. Therefore, detail descriptions of cooling/heating change-over switch 50 and heating mode change-over switch 51 will be omitted here.

In this second embodiment, the cooling/heating operation is carried out in the same manner as in the first embodiment, except that air in the room is induced into housing 41 through inlets 45a formed on the portions near the bottom of housing 41 and then exhausted from outlet 46 formed at the top of housing 41.

In the above embodiments, the operation frequency at the beginning of radiant heating is set to the value higher than the operation frequency that in the ordinary operation state, until the temperature detected by panel temperature sensor 56 reaches to a prescribed value slightly lower than a prescribed set temperature. However, the embodiments may be so modified by providing a temperature sensor to detect the temperature of refrigerant discharged from compressor 22. In this case, the operation frequency is set to a value higher than the operation frequency in the ordinary operation state, until the discharged refrigerant temperature reaches the prescribed set temperature.

Moreover, in the above embodiments, the operations of the air conditioner are described for heating only. However, it will be evident for persons skilled in the art that the air conditioner according to the present invention cool using at least indoor heat exchanger 27 and, in some embodiments, radiant heat exchanger 29.

As described above, the present invention can provide an extremely well operating air conditioner.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. An air conditioner provided with a heat-pump system refrigerating cycle comprising:
    a compressor;
    an outdoor heat exchanger, connected to said compressor;
    a pressure reducing device connected to said outdoor heat exchanger and said compressor;
    an indoor heat exchanger connected to said compressor, said outdoor heat exchanger and pressure reducing device and installed within a room;
    an indoor fan disposed adjacent to said indoor heat exchanger;
    a radiation heat exchanger disposed in said room, connected to said compressor, said indoor heat exchanger, said pressure reducing device and said outdoor heat exchanger in a circuit; and
    means, coupled to said indoor fan, for allowing a user to manually select between a warm-air heating mode during which said indoor fan is turned on to produce a warm air output, and a radiant heating mode during which an output of said indoor fan is less than an amount of said warm air output during said warm-air heating mode, and
    means for reducing a capacity of said compressor during said radiant heating to an amount that is below a maximum capacity of said compressor that occurs during said warm-air heating, wherein a refrigerant continues to flow for both said warm air heating and said radiant heating.

2. An air conditioner provided with a heat-pump system refrigeration cycle comprising:
    a compressor;
    an outdoor heat exchanger;
    a pressure reducing device;
    an indoor heat exchanger installed within a room;
    an indoor fan disposed adjacent in said indoor heat exchanger;
    a radiation heat exchanger disposed in said room, said compressor, said indoor heat exchanger, said radiant heat exchanger, said pressure reducing device and said indoor heat exchanger being connected in a circuit;
    means for monitoring ambient temperature in said room;
    means coupled to said indoor fan for allowing selection between warm-air heating during which said indoor fan is turned on and radiant heating during which an output of said indoor fan is less than the output during said warm-air heating, said allowing means including means for reducing an output of said indoor fan when the ambient temperature is close to a desired temperature during heating operation.

3. An air conditioner as claimed in claim 2, further comprising means for reducing a capacity of said compressor during said radiant heating below the maximum capacity of said compressor during said warm-air heating.

4. An air conditioner as claimed in claim 28, wherein said causing means increases the capacity of said compressor at the beginning of radiant heating.

5. An air conditioner as claimed in claim 2, wherein said reducing means includes means for turning on said indoor fan when the ambient temperature is substantially below the desired temperature and for turning off said compressor when the ambient temperature is more than a predetermined amount above the desired temperature.

6. An air conditioner as claimed in claim 5, wherein said fan output reducing means turns off said indoor fan when the ambient temperature is close to the desired temperature.

7. An air conditioner as claimed in claim 5, wherein said fan output reducing means intermittently turns on and off said indoor fan when the ambient temperature is close to the desired temperature.

8. An air conditioner as claimed in claim 5, wherein said fan output reducing means reduces a speed of said indoor fan when the ambient temperature is close to the desired temperature.

9. An air conditioner as claimed in claim 5, wherein said allowing means selects between both warm-air and radiant heating during which said indoor fan is turned on and radiant heating only during which an output of said indoor fan is less than the output during said both warm-air and radiant heating.

10. An air conditioner as claimed in claim 2, further comprising a four-way valve for controlling the direction of flow from said compressor.

11. An air conditioner as claimed in claim 10, further comprising means for causing refrigerant to flow through said radiant heat exchanger when said four-way valve is set for heating and for causing refrigerant to bypass said radiant heat exchanger when said four-way valve is set for cooling.

12. An air conditioner as claimed in claim 10, wherein said indoor heat exchanger and said radiant heat exchanger are connected in parallel and said air conditioner further comprises a valve connected to each of said indoor heat exchanger and said radiant heat exchanger, said valve connected to said radiant heat exchanger being closed when said four-way valve is set for cooling.

13. An air conditioner as claimed in claim 2, wherein said selection allowing means is voluntarily operable by a user.

14. An air conditioner as claimed in claim 13, further comprising means for reducing a capacity of said compressor during said radiant heating below the maximum capacity of said compressor during said warm-air heating.

15. An air conditioner as claimed in claim 14 wherein a refrigerant continues to flow during either warm-air heating or radiant heating or both.

16. An air conditioner provided with a heat-pump system refrigerating cycle comprising:
a compressor;
an outdoor heat exchanger;
a pressure reducing device;
an indoor heat exchanger installed within a room;
an indoor fan disposed adjacent in said indoor heat exchanger;
a radiation heat exchanger disposed in said room, said compressor, said indoor heat exchanger, said radiant heat exchanger, said pressure reducing device and said outdoor heat exchanger being connected in a circuit;
means coupled to said indoor fan for allowing selection between warm-air heating during which said indoor fan is turned on and radiant heating during which an output of said indoor fan is less than the output during said warm-air heating;

means for reducing a capacity of said compressor during said radiant heating below the maximum capacity of said compressor during said warm-air heating;
first means for monitoring a temperature of refrigerant downstream of said compressor; and
second means for monitoring an outdoor temperature, said reducing means controlling a capacity of said compressor in response to outputs from either said first monitoring means or said second monitoring means.

17. An air conditioner as claimed in claim 16 wherein said causing means increases the capacity of said compressor at the beginning of radiant heating.

18. An air conditioner as claimed in claim 16, further comprising a four-way valve for controlling the direction of flow from said compressor.

19. An air conditioner as claimed in claim 18, further comprising means for causing refrigerant to flow through said radiant heat exchanger when said four-way valve is set for heating and for causing refrigerant to bypass said radiant heat exchanger when said four-way valve is set for cooling.

20. An air conditioner as claimed in claim 18, wherein said indoor heat exchanger and said radiant heat exchanger are connected in parallel and said air conditioner further comprises a valve connected to each of said indoor heat exchanger and said radiant heat exchanger, said valve connected to said radiant heat exchanger being closed when said four-way valve is set for cooling.

21. An air conditioner as claimed in claim 16, wherein said allowing means selects between both warm-air and radiant heating during which said indoor fan is turned on and radiant heating only during which an output of said indoor fan is less than the output during said both warm-air and radiant heating.

22. An air conditioner as claimed in claim 16 further comprising means for monitoring ambient temperature in said room, said monitoring means including means for reducing an output of said indoor fan when the ambient temperature is close to a desired temperature during heating operation.

23. An air conditioner as claimed in claim 22 wherein said reducing means includes means for turning on said indoor fan when the ambient temperature is substantially below the desired temperature and for turning off said compressor when the ambient temperature is more than a predetermined amount above the desired temperature.

24. An air conditioner as claimed in claim 23, wherein said fan output reducing means turns off said indoor fan when the ambient temperature is close to the desired temperature.

25. An air conditioner as claimed in claim 20, wherein said fan output reducing means intermittently turns on and off said indoor fan when the ambient temperature is close to the desired temperature.

26. An air conditioner as claimed in claim 23, wherein said fan output reducing means reduces a speed of said indoor fan when the ambient temperature is close to the desired temperature.

27. An air conditioner as claimed in claim 23, wherein said allowing means selects between both warm-air and radiant heating during which said indoor fan is turned on and radiant heating only during which an output of said indoor fan is less than the output during said both warm-air and radiant heating.

28. A method of heating comprising the steps of:
- circulating refrigerant with a compressor from the compressor through a circuit including an indoor heat exchanger, a radiant heat exchanger, a pressure reducing device and an outdoor heat exchanger to pump heat into a room;
- selectively energizing an indoor fan, disposed adjacent said indoor heat exchanger, and reducing an output of said indoor fan to change between warm-air heating and radiant heating, respectively;
- monitoring ambient temperature in said room, said energizing step reducing an output of said indoor fan when the ambient temperature is close to a desired temperature.

29. A method of heating as claimed in claim 28 further comprising the step of reducing a capacity of said compressor during radiant heating below said capacity of said compressor during said warm-air heating.

30. A method of heating as claimed in claim 29 further comprising the step of increasing said capacity of said compressor at the beginning of radiant heating to quickly heat said radiant heat exchanger.

31. A method of heating as claimed in claim 28, wherein said energizing step turns on said indoor fan when the ambient temperature is substantially below the desired temperature and turns off said compressor when the ambient temperature is more than a prescribed amount above the desired temperature.

32. A method of heating as claimed in claim 31 wherein said fan output reducing step turns off said indoor fan when the ambient temperature is close to the desired temperature.

33. A method of heating as claimed in claim 31 wherein said fan output reducing step intermittently turns on and off said indoor fan when the ambient temperature is close to the desired temperature.

34. A method of heating as claimed in claim 31 wherein said fan output reducing step reduces a speed of said indoor fan when the ambient temperature is close to the desired temperature.

35. A method of heating as claimed in claim 28 wherein said energizing step is voluntarily operable by a user.

36. A method of heating as claimed in claim 35 further comprising the step of reducing a capacity of said compressor during radiant heating below said capacity of said compressor during said warm-air heating.

37. A method of heating as claimed in claim 35 wherein said refrigerant circulates during both said warm-air heating and said radiant heating.

38. A method of heating comprising the steps of:
- circulating refrigerant with a compressor from the compressor through a circuit including an indoor heat exchanger, a radiant heat exchanger, a pressure reducing device and an outdoor heat exchanger to pump heat into a room;
- selectively energizing an indoor fan, disposed adjacent said indoor heat exchanger, and reducing an output of said indoor fan to change between warm-air heating and radiant heating, respectively;
- reducing a capacity of said compressor during radiant heating below said capacity of said compressor during said warm-air heating;
- monitoring a temperature of refrigerant downstream of said compressor; and
- monitoring an output temperature;
- said reducing step controlling the capacity of said compressor in response to either monitoring steps.

39. A method of heating as claimed in claim 38 further comprising the step of increasing said capacity of said compressor at the beginning of radiant heating to quickly heat said radiant heat exchanger.

40. A method of heating as claimed in claim 38 further comprising the step of monitoring ambient temperature in said room, said energizing step reducing an output of said indoor fan when the ambient temperature is close to a desired temperature.

41. A method of heating as claimed in claim 38 wherein sad energizing step turns on said indoor fan when the ambient temperature is substantially below the desired temperature and turns off said compressor when the ambient temperature is more than a prescribed amount above the desired temperature.

42. A method of heating as claimed in claim 41 wherein said fan output reducing step turns off said indoor fan when the ambient temperature is close to the desired temperature.

43. A method of heating as claimed in claim 41 wherein said fan output reducing step intermittently turns on and off said indoor fan when the ambient temperature is close to the desired temperature.

44. A method of heating as claimed in claim 41 wherein said fan output reducing step reduces a speed of said indoor fan when the ambient temperature is close to the desired temperature.

* * * * *

UNITED STATES PATENT AND TRADEMARK OFFICE
CERTIFICATE OF CORRECTION

PATENT NO. : 4,939,910
DATED : July 10, 1990
INVENTOR(S) : Umezu et al.

It is certified that error appears in the above-indentified patent and that said Letters Patent is hereby corrected as shown below:

TITLE PAGE

Insert --[73] Assignee: Kaubushiki Kaisha Toshiba--.

Insert --Attorney, Agent or Firm - CUSHMAN, DARBY & CUSHMAN--.

Signed and Sealed this

Twenty-fifth Day of October, 1994

Attest:

BRUCE LEHMAN

Attesting Officer          Commissioner of Patents and Trademarks